US007160531B1

(12) United States Patent
Jacques et al.

(10) Patent No.: US 7,160,531 B1
(45) Date of Patent: Jan. 9, 2007

(54) PROCESS FOR THE CONTINUOUS PRODUCTION OF ALIGNED CARBON NANOTUBES

(75) Inventors: David N. Jacques, Lexington, KY (US); Rodney J. Andrews, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 642 days.

(21) Appl. No.: 10/141,423

(22) Filed: May 8, 2002

Related U.S. Application Data (60) Provisional application No. 60/289,415, filed on May 8, 2001, provisional application No. 60/289,745, filed on May 9, 2001, provisional application No. 60/356,272, filed on Feb. 11, 2002.

(51) Int. Cl.
*D01C 5/00* (2006.01)
*D01F 9/12* (2006.01)

(52) U.S. Cl. .............................. 423/447.3; 423/447.1; 423/447.5; 977/742

(58) Field of Classification Search .............. 423/447.3
See application file for complete search history.

(56) References Cited

U.S. PATENT DOCUMENTS 5,227,142 A * 7/1993 Murai et al. ................. 422/219

OTHER PUBLICATIONS

Jacques, D.; Villain, S.; Rao, A.M.; Andrews, R.; Derbyshire, F.;Dickey, E.C.; Qian, D. "Synthesis of Multiwalled Carbon Nanotubes," Materials Research Society Symposium Proceedings, vol. 593, 15-20 1999.
Andrews, R.; Jacques, D.; Rao, A.M.; Derbyshire, F.; Qian, D.; Fan, X.; Dickey, E.C.; Chen, J., Continuous Production of Aligned Carbon Nanotubes: A Step Closer to Commercial Realization,: Chemical Physics Letters 303, pp. 467-474, Apr. 16, 1999.

* cited by examiner

*Primary Examiner*—Steven Bos
*Assistant Examiner*—James Fiorito
(74) *Attorney, Agent, or Firm*—King & Schickli, PLLC (57) ABSTRACT

Novel methods and apparati for continuous production of aligned carbon nanotubes are disclosed. In one aspect, the method comprises dispersion of a metal catalyst in a liquid hydrocarbon to form a feed solution, and volatilizing the feed solution in a reactor through which a substrate is continuously passed to allow growth of nanotubes thereon. In another aspect, the apparatus comprises a reactor, a tube-within-a-tube injector, and a conveyor belt for passing a substrate through the reactor. The present invention further discloses a method for restricting the external diameter of carbon nanotubes produced thereby comprising passing the feed solution through injector tubing of a specified diameter, followed by passing the feed solution through an inert, porous medium. The method and apparati of this invention provide a means for producing aligned carbon nanotubes of a particular external diameter which is suitable for large scale production in an industrial setting.

26 Claims, 4 Drawing Sheets

PROCESS FOR THE CONTINUOUS PRODUCTION OF ALIGNED CARBON NANOTUBES

This application claims the benefit of U.S. Provisional Patent Application Ser. Nos. 60/289,415 filed May 8, 2001, 60/289,745 filed May 9, 2001, and 60/356,272 filed Feb. 11, 2002.

This invention was made with Government support under NSF-MRSEC grant DMR-9809606. The Government may have certain rights in this invention.

TECHNICAL FIELD

The present invention relates to methods for producing aligned carbon nanotubes, and more particularly to methods and apparati for continuous production of aligned carbon nanotubes. The invention further relates to methods and apparati for continuous production of aligned carbon nanotubes which do not require patterned substrates, and which further produce quantities of high quality, homogenous populations of nanotubes.

BACKGROUND OF THE INVENTION

Aligned carbon nanotubes have application in numerous areas of composite materials, such as for use in separation media, as catalysts, as catalyst supports, in energy storage and transfer, in electronics applications such as in electron guns for use, e.g., in flat panel television picture technology, for EMI and RF shielding such as in the cellular telephone industry, as sensors or sensor components, and for use in electronically conductive plastics. Currently utilized technologies for production of aligned carbon nanotubes are labor intensive, costly, inefficient, and are not amenable to scale-up for industrial applicability.

The synthesis of aligned carbon nanotubes, such as multi-walled carbon nanotubes, via catalytic pyrolysis of hydrocarbons is known. Most of the known methodology for such synthesis requires use of patterned or preformed substrates to provide support to the growing nanotubes, allowing growth in an aligned pattern. Further, the presently utilized methods for synthesis of aligned carbon nanotubes rely on batch processes. While effective, batch processing methods for production of carbon nanotubes, particularly aligned carbon nanotubes, are labor intensive, costly, inefficient, and generally limited in production capacity at the industrial scale. Further, batch processing techniques may result in significant batch to batch variation in the quality of the nanotubes produced.

Accordingly, there is a need in the art for methods of production of carbon nanotubes which result in a high quality, homogenous population of aligned nanotubes. There is further a need in the art for such methods, and for apparati for conducting the methods, which do not require specialized patterned substrates. The methods should reduce the labor required, and be amenable to scale-up for use in industrial applications requiring reproducibility, low cost, high volume, and a high quality product.

SUMMARY OF THE INVENTION

In accordance with the purposes of the present invention as described herein, a novel method for continuous production of aligned carbon nanotubes is described, beginning with dissolving a metal catalyst in a liquid hydrocarbon source to form a feed solution and dispersing the feed solution into a stream of an inert carrier gas. In a preferred embodiment, metal catalyst is admixed with said liquid hydrocarbon to yield a metal to carbon ratio of from about 0.075 atomic percent to about 1.25 atomic percent. In an especially preferred embodiment, metal catalyst is admixed with said liquid hydrocarbon to yield a metal to carbon ratio of 0.75 atomic percent. Suitable metal catalysts include the group consisting of ferrocene, nickelocene, cobaltocene, manganocene, ruthenocene, iron napthenate, nickel napthenate, cobalt napthenate and any mixture thereof.

Any liquid hydrocarbon capable of being vaporized at a temperature of from about 150 C to about 600 C and having a solubility of at least 0.5 weight percent for the metal catalyst selected may be used in the method of the present invention. This includes aromatic hydrocarbons, aliphatic hydrocarbons, and nitrogen-containing hydrocarbons. The liquid hydrocarbon may be selected from the group consisting of xylene, toluene, benzene, hexane, pyridine, acetonitrile, or any combination thereof. Any known inert carrier gas is suitable, including the noble (Group VIII) gases, nitrogen, or mixtures thereof. Specific examples include argon, helium, nitrogen, and any combination. In a preferred embodiment, hydrogen is included in the inert carrier gas at a concentration of up to 30 volume percent. In a particularly preferred embodiment, the inert carrier gas stream contains hydrogen in a concentration of 10 volume percent.

The dispersed feed solution is then continuously introduced into a reactor and volatilized. In a preferred embodiment, the reactor should be maintained at a temperature of from about 500 C to about 900 C. In an especially preferred embodiment, the reactor is maintained at a temperature of from about 650 C to about 850 C. Of course, those of skill in the art will realize that the optimal reactor temperature will depend on the volatilization temperature of the metal catalyst/liquid hydrocarbon feed solution of choice.

The rate at which the feed solution is delivered into the reactor is dependant on the metal catalyst concentration, reactor temperature, and gas flow rate. However, for optimal production of aligned carbon nanotubes, it is desirable to deliver the feed solution below the partial pressure (carbon) that elicits the co-generation of amorphous or pyrolytic carbon. Typically, the feed solution dispersed in inert carrier gas is delivered into the reactor at a partial pressure (carbon) of from about 4 millibar to about 150 millibar. In a particularly preferred embodiment, the feed solution is delivered into the reactor to maintain a partial pressure of carbon of from about 48 millibar to about 150 millibar. Preferably, an oxygen- and ambient air-free environment is maintained within the reactor. This may be accomplished by any known means, such as for example a nitrogen purge box or a gas curtain placed at an opening of the reactor.

Concurrently therewith, a suitable substrate is continuously passed through the reactor to allow growth of aligned carbon nanotubes thereon. Substrate materials which do not have substantial carbon solubility at temperatures below 900 C are preferred. Any suitable substrate for promoting the growth of carbon nanotubes may be employed, preferably an inert glass or metal with thermal stability at a temperature of from about 500 C to about 900 C. Suitable substrates include quartz, silicon, n-doped silicon, p-doped silicon, titanium nitride, and any mixture thereof. In a preferred embodiment of the present invention, the residence time of the substrate within the reactor is from about 10 minutes to about 120 minutes.

In another aspect of the method of the present invention, a method for continuous production of aligned carbon nanotubes with a tightly controlled range of external diameters is disclosed. Surprisingly, it has been discovered that the external diameter of aligned carbon nanotubes produced in accordance with the method of the present invention may be controlled by passing the metal catalyst/liquid hydrocarbon feed solution dispersed in the inert carrier gas through tubing of a particular inner diameter, followed by passing the feed solution through an inert, porous medium prior to delivery into the reactor. The inert, porous medium may be fabricated from any suitable inert powdered metal or ceramic, including any of the transition element metals or alloys thereof, as well as alumina, zirconia, silicon carbide, or silica ceramics. Specific examples include, but are not limited to, ceramic, alumina, steel, stainless steel, nickel, titanium, nickel-chromium alloys, or mixtures thereof. In a preferred embodiment, the inert, porous medium contains pores of from about 0.1 µm to about 1 µm in diameter. The final step is to mechanically recover the aligned carbon nanotubes from the substrate, for example by scraping, brushing, or ultrasonic cleaning. Process gases may be vented, or in a preferred embodiment are recycled through the reactor to preserve the concentration of hydrogen in the carrier gas.

In yet another aspect of the present invention, an apparatus for continuous production of aligned carbon nanotubes is taught, comprising a reactor, an injector for delivering a feed solution dispersed in an inert carrier gas into the hollow interior of the reactor, and a conveyor belt for continuously passing a substrate through the reactor at a controlled speed. It is preferred to exclude ambient air from the interior of the reactor during the reaction process. Those of skill in the art will appreciate that the reactor and conveyor belt may be fabricated from any suitably inert material which substantially prevents carbon nanotube growth thereon. In that way, nanotube growth is concentrated on the substrate passing through the reactor. Any suitably non-reactive metal or ceramic may be utilized, such as alumina, silicon carbide, Nichrome, and any combination. In accordance with the method of the present invention already disclosed, it will be appreciated that the conveyor belt is configured to pass the substrate through the reactor at a speed which provides a substrate residence time of from about 10 minutes to about 120 minutes.

The injector of the present invention comprises a tube-within-a-tube design configured for improved flow characteristics and feed consistency of the feed solution/carrier gas stream entering the reactor. In a presently preferred embodiment, the injector comprises a first hollow tube for delivering the feed solution as described supra and a second hollow tube for delivering the inert carrier gas. The first hollow tube is disposed in the interior of the second hollow tube, thereby defining an annulus between the first and second hollow tubes through which the inert carrier gas may be delivered. The end of the second tube extends beyond the corresponding end of the first tube, thereby defining a dispersion chamber wherein the feed solution is dispersed into the inert carrier gas prior to entry into the reactor.

Preferably, the first hollow tube has an outer cross-sectional area of from about 50 percent to about 90 percent of the internal cross-sectional area of the second hollow tube. In a preferred embodiment, the carrier gas is delivered through the annulus between the tubes at a Reynold's number of between about 1 and about 2000. In a particularly preferred embodiment, the carrier gas is delivered through the annulus at a Reynold's number of between about 50 and about 200. The dimensions of the first and second tubes, and their orientation relative to one another, are configured such that the dispersion chamber formed thereby preferably has a length of from about 1 to about 15 times its diameter. In a particularly preferred embodiment, the length of the dispersion chamber is from about 8 to about 10 times its diameter.

As noted above, in one aspect of the method of this invention the catalyst/hydrocarbon/carrier gas dispersion may be passed through an inert, porous medium prior to entry into the reactor to control the external diameter of nanotubes formed thereby. Accordingly, the apparatus of the present invention preferably includes such an inert, porous medium terminal to the injector, in the form of a sinter fabricated from materials including, but not limited to, transition metals and their alloys, alumina, zirconia, silicon carbide, or silica ceramics. Specific examples include ceramic, alumina, steel, stainless steel, titanium, and any combination thereof. The sinter is selected to include a poresize of from about 0.1 µm to about 1 µm in diameter.

The injector of the present invention may be adapted for axial movement within the reactor. As will be appreciated by those skilled in the art and further described below, this feature obviates the need for multiple reactors of different temperatures, such as for example a preheater followed by a reactor providing the desired temperature. Rather, the axially movable injector of the present design allows use of a single reactor, in which the feed solution/carrier gas may be delivered at any desired temperature zone. Thus, if the injector is maintained at a lower temperature zone of the reactor, the preheating step is accomplished. Moving the injector to a higher temperature zone of the reactor will allow the desired volatilization and nanotube-growing steps to occur. Accordingly, an actuator for moving the injector axially within the reactor may be included in the apparatus of this invention. It will be appreciated that any suitable actuator capable of moving the injector axially in a controlled fashion may be employed, such as a hydraulic or pneumatic cylinder, a rod-type electric cylinder, a belt-driven actuator, a ball screw-driven actuator, a robotic arm, or the like. The actuator may be coupled to a controller for remote operation. The injector may be supported by any suitable support, such as a linear guide having rollers.

It is known that the reaction by which carbon nanotubes are formed are preferably conducted in the absence of ambient air and oxygen. Accordingly, the apparatus of the present invention may include a means for excluding ambient air from the interior of the reactor. This feature may be accomplished by known devices, such as a nitrogen purge box or gas curtain adjacent the opening where the conveyor belt enters the reactor.

In still yet another aspect of the present invention, a novel injector for use in continuous production of aligned carbon nanotubes is taught. As noted above, the injector is a tube-within-a-tube design including a first hollow tube for delivering the feed solution disposed within a second hollow tube for delivering the carrier gas, an annulus between the tubes through which the inert carrier gas is delivered. An end of the second tube extends beyond the corresponding end of the first tube, thereby defining a dispersion chamber wherein the feed solution is dispersed into the inert carrier gas prior to exiting the injector. The injector may further include an inert, porous medium terminal to the dispersion chamber for restricting the external diameter range of nanotubes formed thereby as described above. The preferred dimensions and suitable materials for fabrication of the components of the injector have been described above. While the injector as described is suitable for accomplishing the methods of the present invention as disclosed, it will be appreciated that the injector is also suitable for growth of aligned carbon nanotubes by other procedures, such as traditional batch processes.

In still yet another aspect of the present invention, a method of controlling the external diameter of carbon nanotubes produced by chemical vapor deposition is disclosed, comprising the steps of dissolving a metal catalyst in a liquid hydrocarbon source to form a feed solution, dispersing the feed solution in an inert carrier gas in a dispersion chamber, passing the feed solution/inert carrier gas dispersion through injector tubing of a desired inner diameter, and passing the feed solution through an inert, porous medium. The next step is to volatilize the feed solution in a reactor, while concurrently continuously passing a substrate through the reactor to allow growth of aligned carbon nanotubes thereon, and recovering the aligned carbon nanotubes from the substrate.

Suitable dimensions and materials for fabrication of components necessary for accomplishing the method for restricting external diameter of aligned carbon nanotubes grown thereby are as disclosed supra. It will be appreciated that the method as described is also suitable for restricting external diameter of carbon nanotubes grown in traditional batch procedures. In accordance with the injector tubing and pore size of the porous medium selected, growth of aligned carbon nanotubes having external diameters of from about 4 nm to about 300 nm is possible by the method herein disclosed.

Other objects and applications of the present invention will become apparent to those skilled in this art from the following description wherein there is shown and described a preferred embodiment of this invention, simply by way of illustration of the modes currently best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention and, together with the description, serves to explain the principles of the invention. In the drawing.

Reference will now be made in detail to the presently preferred embodiments of the invention, examples of which are illustrated in the accompanying drawing.

DETAILED DESCRIPTION OF THE INVENTION

As summarized above, the present invention relates to novel methods and apparati for continuous production of aligned carbon nanotubes. The methods and compositions of the present invention may be accomplished by various means which are illustrated in the examples below. These examples are intended to be illustrative only, as numerous modifications and variations will be apparent to those skilled in the art.

In one aspect, a novel method for continuous production of aligned carbon nanotubes is described, beginning with dissolving a metal catalyst in a liquid hydrocarbon source to form a feed solution and dispersing the feed solution into a stream of an inert carrier gas. In a preferred embodiment, metal catalyst is admixed with said liquid hydrocarbon to yield a metal to carbon ratio of from about 0.075 atomic percent to about 1.25 atomic percent. In an especially preferred embodiment, metal catalyst is admixed with said liquid hydrocarbon to yield a metal to carbon ratio of 0.75 atomic percent. Suitable metal catalysts include the group consisting of ferrocene, nickelocene, cobaltocene, manganocene, ruthenocene, iron napthenate, nickel napthenate, cobalt napthenate and any mixture thereof. In a preferred embodiment of the method of this invention, ferrocene is selected as the metal catalyst.

Any liquid hydrocarbon capable of being vaporized at a temperature of from about 150 C to about 600 C and having a solubility of at least 0.5 weight percent for the metal catalyst selected may be used in the method of the present invention. Accordingly, it will be appreciated that the method for producing aligned carbon nanotubes of the present invention may be conducted at relatively moderate temperatures, and at atmospheric pressure, thereby reducing energy consumption and production costs and further enhancing the commercial utility thereof. Suitable liquid hydrocarbons include aromatic hydrocarbons, aliphatic hydrocarbons, or nitrogen-containing hydrocarbons. In a preferred embodiment, the liquid hydrocarbon may be xylene, toluene, benzene, hexane, pyridine, acetonitrile, or any combination thereof. The carrier gas may be selected from the noble (Group VIII) gases, nitrogen, or mixtures thereof. Typical examples include argon, helium, nitrogen, and any combination thereof. It is preferred to include hydrogen in the inert carrier gas at a concentration of up to 30 volume percent. In a particularly preferred embodiment, hydrogen is included in the carrier gas stream at a concentration of 10 volume percent.

The dispersed feed solution is then continuously introduced into a reactor and volatilized. Suitable reactor designs for producing carbon nanotubes are known in the art. Preferably, the reactor is maintained at a temperature of from about 500 C to about 900 C. In an especially preferred embodiment, the reactor is maintained at a temperature of from about 650 C to about 850 C. Those of skill in the art will realize that the optimal reactor temperature selected will depend on the temperature required to volatilize the metal catalyst/liquid hydrocarbon dispersion selected. Again, the relatively moderate temperature at which the reaction may be conducted contributes to the commercial desirability of this method.

The rate at which the feed solution is delivered into the reactor is dependant on the metal catalyst concentration, reactor temperature, and gas flow rate. Desirably, the feed solution is delivered into the reactor at a flow rate below the partial pressure (carbon) that elicits the co-generation of amorphous or pyrolytic carbon under the particular run conditions of choice. Typically, the feed solution dispersed in inert carrier gas is delivered into the reactor at a partial pressure (carbon) of from about 4 millibar to about 150 millibar, preferably from about 48 millibar to about 150 millibar. An oxygen- and ambient air-free environment may be maintained within the reactor by any desired means, such as a nitrogen purge box or a gas curtain placed at an opening of the reactor.

In the next step, suitable substrate materials may be continuously passed through the reactor to allow growth of aligned carbon nanotubes thereon. Any suitable substrate for promoting the growth of carbon nanotubes may be employed, preferably materials not having substantial carbon solubility at temperatures below 900 C. It is preferred to utilize an inert glass or metal exhibiting thermal stability at a temperature of from about 500 C to about 900 C in accordance with the temperature range achievable by the reactor. Suitable substrates include quartz, silicon, n-doped silicon, p-doped silicon, titanium nitride, or combinations thereof. To allow the desired level of nanotube growth, the residence time of the substrate within the reactor may be set at from about 10 minutes to about 120 minutes, in accordance with the physical dimensions of the reactor. The final step is to mechanically recover the aligned carbon nanotubes from the substrate for subsequent processing and/or use. Process gases may be vented, or in a preferred embodiment are recycled through the reactor while preserving the concentration of hydrogen in the carrier gas.

Figure 1:
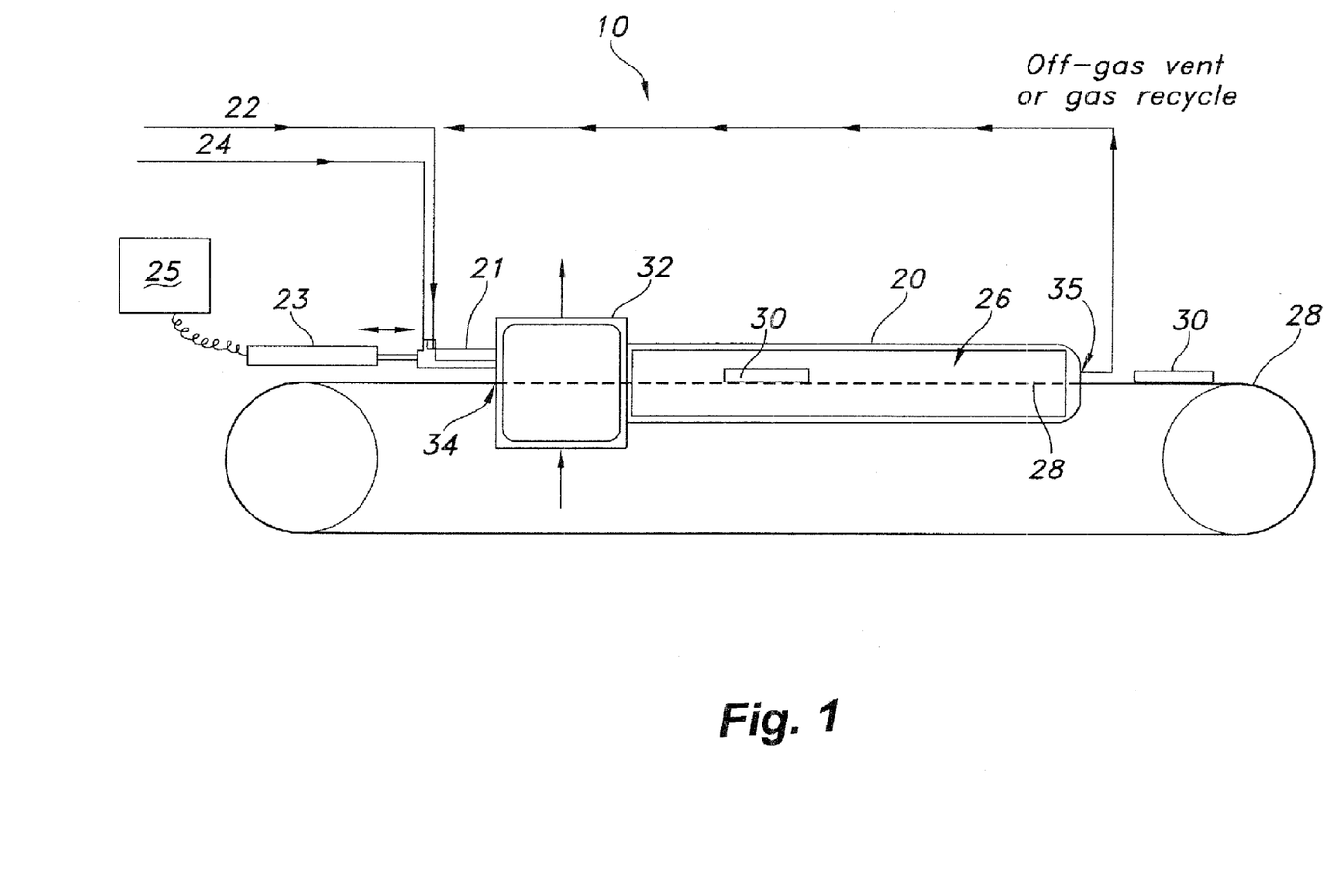
FIG. 1 is a schematic representation of the apparatus for continuously producing carbon nanotubes of the present invention.

Referring now to FIG. 1, in accordance with the method of the present invention, an apparatus 10 for continuous production of aligned carbon nanotubes is also taught, comprising a reactor 20, an injector 21 for delivering a feed solution 22 dispersed in an inert carrier gas 24 into the hollow interior 26 of the reactor 20, and an endless conveyor belt 28 for continuously passing a substrate 30 through the reactor 20 at a controlled speed. It should be appreciated that the direction in which the conveyor belt 28 passes the substrate 30 through the reactor 20 is not critical. The apparatus 10 may further include an actuator, shown for purposes of demonstration as a rod-type electric cylinder 23 coupled to a controller 25, for axially moving the injector 21 within the reactor 20. Those of skill in the art will appreciate that the reactor 20 and conveyor belt 28 may be fabricated from any suitably inert material which substantially prevents carbon nanotube growth thereon. In that way, nanotube growth is substantially restricted to the substrate 30 as it passes through the reactor 20. Any suitably non-reactive metal or ceramic may be utilized, such as alumina, silicon carbide, Nichrome, and any combination.

In accordance with the method of the present invention already disclosed, it will be appreciated that the conveyor belt 28 is configured to pass the substrate 30 through the reactor 20 at a speed which provides a substrate residence time of from about 10 minutes to about 120 minutes, thereby optimizing growth conditions. The optimal substrate residence time, of course, will depend on variables such as the physical dimensions and temperature of the reactor 20, on the volatilization characteristics of the feed solution of choice, and the like.

An insert (not shown), generally having the shape of an inverted "D", may be included within the hollow interior 26 of the reactor 20 to provide support for the conveyor belt 28. However, it will be appreciated that any support means for the conveyor belt 28 may be adapted, such as a roller and track system (not shown) attached to the interior 26 of the reactor 20. The reactor 20 further includes a nitrogen purge box 32 located at the entry point 34 of the conveyor belt 28 for excluding ambient air/oxygen. It should be appreciated that any means for excluding ambient air, such as a gas curtain, is suitable for the method and apparatus of this invention. Soft seals (not shown) of a known design may be included at the entry point 34 and the exit point 35 of the reactor 20 to further reduce entry of ambient air, contaminants, and the like into the interior 26 of the reactor 20.

Figure 2:
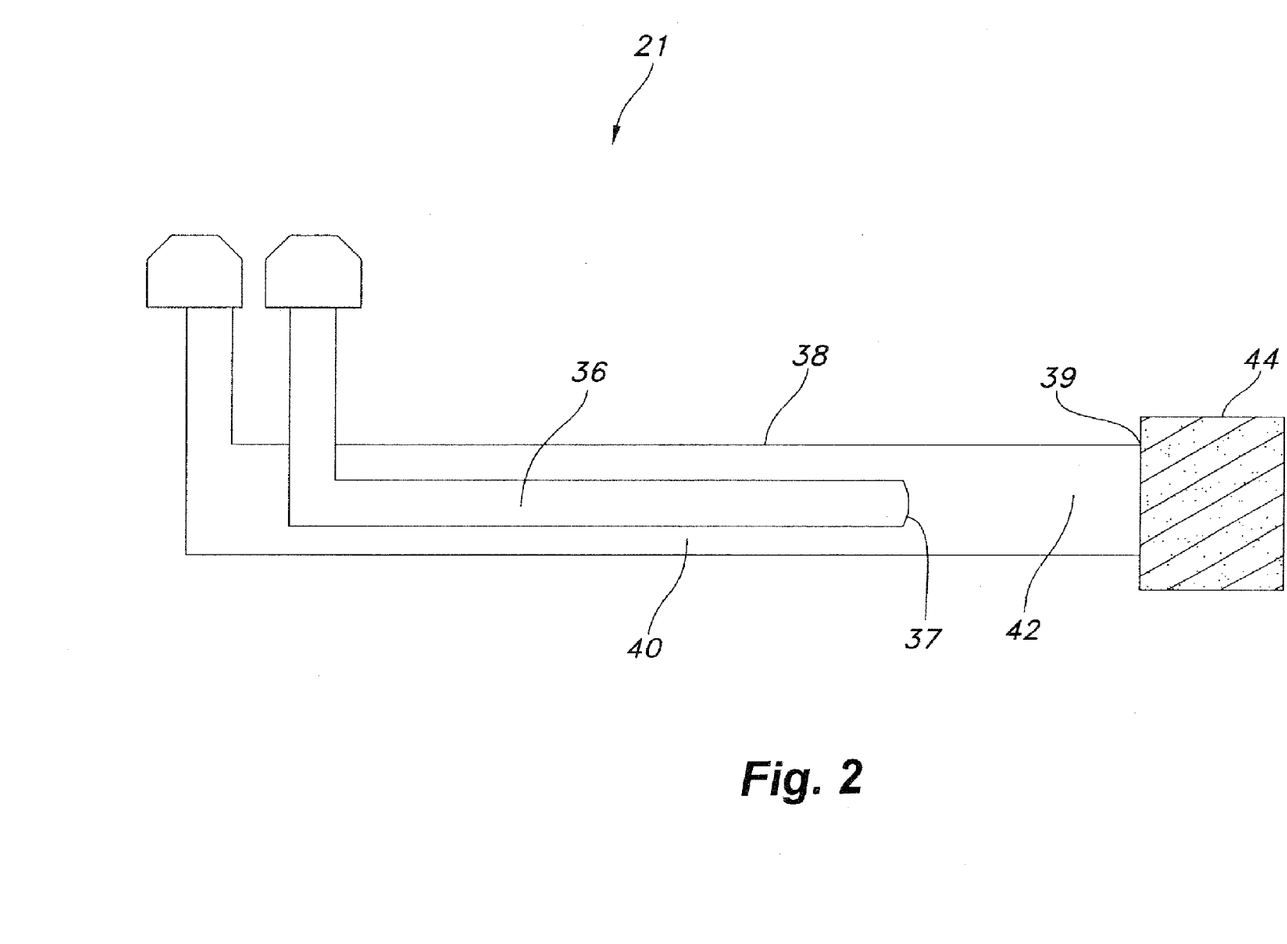
FIG. 2 is a schematic cross-sectional view of the injector of the present invention.

The injector 21 of the present invention, as best seen in FIG. 2, comprises a tube-within-a-tube design configured to improve the flow characteristics and feed consistency of the feed solution/carrier gas stream entering the reactor 20. In a presently preferred embodiment, the injector 21 comprises a first hollow tube 36 for delivering the feed solution as described supra and a second hollow tube 38 for delivering the inert carrier gas. The first hollow tube 36 is disposed in the interior of the second hollow tube 38, thereby defining an annulus 40 between the first and second hollow tubes 36, 38 through which the inert carrier gas may be delivered. The distal or delivery end 39 of the second tube 38 extends beyond the corresponding end 37 of the first tube 36, thereby defining a dispersion chamber 42 wherein the feed solution is dispersed into the inert carrier gas prior to entry into the reactor 20.

Preferably, the first hollow tube 36 has an outer cross-sectional area of from about 50 percent to about 90 percent of the internal cross-sectional area of the second hollow tube 38. To assure laminar flow characteristics of the feed solution/carrier gas entering the reactor 20, the carrier gas is delivered through the annulus 40 at a flow rate resulting in a Reynold's number of between about 1 and about 2000. In a particularly preferred embodiment, the carrier gas is delivered through the annulus 40 to provide a Reynold's number of between about 50 and about 200.

The dimensions of the first and second tubes 36, 38, and their relative orientation, will primarily be determined by the size of reactor 20 employed. In general, the dimensions of the first and second tubes 36, 38, and their relative orientation are configured such that the dispersion chamber 42 formed thereby has a length of from about 1 to about 15 times its diameter. In a particularly preferred embodiment, the length of the dispersion 42 chamber is from about 8 to about 10 times its diameter. While the injector 21 as described is suitable for accomplishing the method of continuous production of aligned carbon nanotubes of the present invention as described, it will be appreciated that the injector 21 is also suitable for traditional batch processes for the growth of carbon nanotubes.

Standard reactors for use in production of carbon nanotubes by chemical vapor deposition are known to possess internal zones of differing temperatures within the same reactor. Accordingly, as shown in FIG. 1, the injector 21 of the present invention is preferably adapted for axial movement within the reactor 20. As will be appreciated by those skilled in the art and further described below, this feature obviates the need for multiple reactors providing different temperatures, such as for example a preheater reactor (not shown) in sequence with a primary reactor 20 providing the desired reaction temperature for growth of nanotubes. Rather, the axially movable injector 21 of the present design allows use of a single reactor 20, in which the feed solution/carrier gas may be delivered to any desired temperature zone within the reactor 20. Thus, placing the injector 21 in a lower temperature zone of the reactor 20 accomplishes the preheating and volatilization steps in an optimal manner without requiring a secondary furnace. In this manner, the required equipment for the process is minimized, resulting in lowered production costs and complexity.

EXAMPLE 1

A device for continuous production of aligned carbon nanotubes was constructed in accordance with the method and apparatus as disclosed herein. A furnace of known design having the dimensions of 2 inches by 3 feet, with 3 heating zones including a 2 foot long reaction zone was utilized as the reactor. The final temperature in the reaction zone was brought to 800 C. A feed solution of ferrocene (2.3 g) and xylene (20 g) was prepared. The feed solution was injected into the reactor through an injector as described herein, having a first (feed solution delivering) tube with an outer diameter of 3.12 mm and a second (carrier gas delivering) tube with an inner diameter of 3.75 mm, and a dispersion chamber having a length of 1.5 inches.

Argon/hydrogen carrier gas flow was initiated and brought to 1200 sccm (1080 sccm Ar, 120 sccm $H_2$). Feed solution was delivered into the reaction zone at a flow rate of 2.70 $ml/h^{-1}$. A conveyor belt as shown in FIG. 1 was activated, and delivered a series of plain (unpatterned) quartz slide substrates through the reactor to provide a substrate residence time within the reactor of 34 minutes. Ambient air and oxygen were excluded from the interior of the reactor using a nitrogen purge box located at the entry point of the reactor.

Figure 3A:
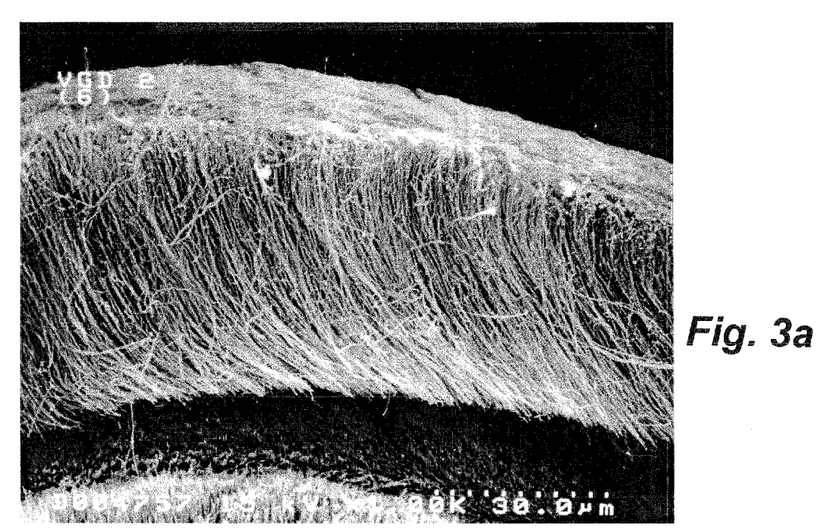
FIGS. 3a and 3b are scanning electron micrograph (SEM) images showing aligned carbon nanotubes produced by the method of the present invention.
Figure 3B:
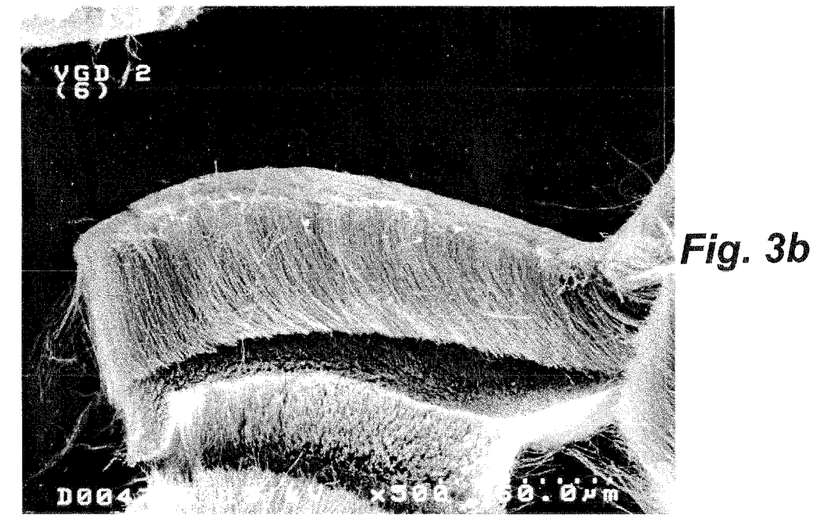

As seen in FIGS. 3a and 3b, the device and method of this invention resulted in production of highly aligned carbon nanotubes of high quality. It is important to note that the aligned carbon nanotubes were produced using the method and device of this invention without need for utilizing a patterned or etched substrate. Accordingly, unlike prior art methods requiring treatment of substrates to produce aligned carbon nanotubes, the method of this invention allows use of either patterned or unpatterned substrates as desired.

In another aspect of the method of the present invention, a method for continuous production of aligned carbon nanotubes having a tightly controlled range of external diameters is disclosed. Surprisingly, it has been discovered that the external diameter of aligned carbon nanotubes produced in accordance with the method of the present invention may be controlled by regulating the inner diameter of the injector tubing through which the feed solution dispersed in the inert carrier gas is passed to improve yield and selectivity, followed by passing the feed solution through an inert, porous medium prior to delivery into the reactor. Referring to FIG. 2, the injector 21 of this invention preferably includes a terminally-located sinter 44, comprising an inert, porous medium of selected pore size dimensions.

The inert, porous medium may be fabricated from any suitable inert powdered metal or ceramic, including the transition element metals and alloys thereof, as well as alumina, zirconia, silicon carbide, or silica ceramics. Specific examples include, but are not limited to, ceramic, alumina, steel, stainless steel, nickel, titanium, nickel-chromium alloys, and any mixture thereof. In a preferred embodiment, the inert, porous medium contains pores of from about 0.1 µm to about 1 µm in diameter.

The method of controlling the external diameter of carbon nanotubes of this invention therefore comprises the steps of: (1) dissolving a metal catalyst in a liquid hydrocarbon source to form a feed solution; (2) dispersing the feed solution in an inert carrier gas in a dispersion chamber; (3) passing the feed solution/inert carrier gas dispersion through an inert, porous medium of the disclosed poresizes; (4) volatilizing the feed solution in a reactor; (5) continuously passing a substrate through the reactor to allow growth of aligned carbon nanotubes thereon; and (6) recovering the aligned carbon nanotubes from the substrate.

Suitable dimensions and materials for fabrication of components necessary for accomplishing the method for restricting external diameter of aligned carbon nanotubes grown in a continuous process are as disclosed supra. However, it should be appreciated that the method as described is also suitable for restricting external diameter of carbon nanotubes grown in traditional batch procedures. In accordance with the pore size of the porous medium selected, growth of aligned carbon nanotubes having homogenous external diameters of from about 4 nm to about 300 nm is made possible by the method herein disclosed.

EXAMPLE 2

The device of this invention was prepared substantially as described in Example 1, with the exception that a batch procedure for production of aligned carbon nanotubes was conducted rather than the continuous procedure of Example 1. All other conditions were maintained as in Example 1. The feed solution as disclosed in Example 1 was passed through stainless steel sinters as described herein, placed terminally on the injector adjacent the dispersion chamber. Sinters having poresizes of 0.2 µm and 0.5 µm were compared to negative controls (no sinter). Feed solution composition and run conditions were as described for Example 1, with the exception of use of a batch procedure.

Figure 4:
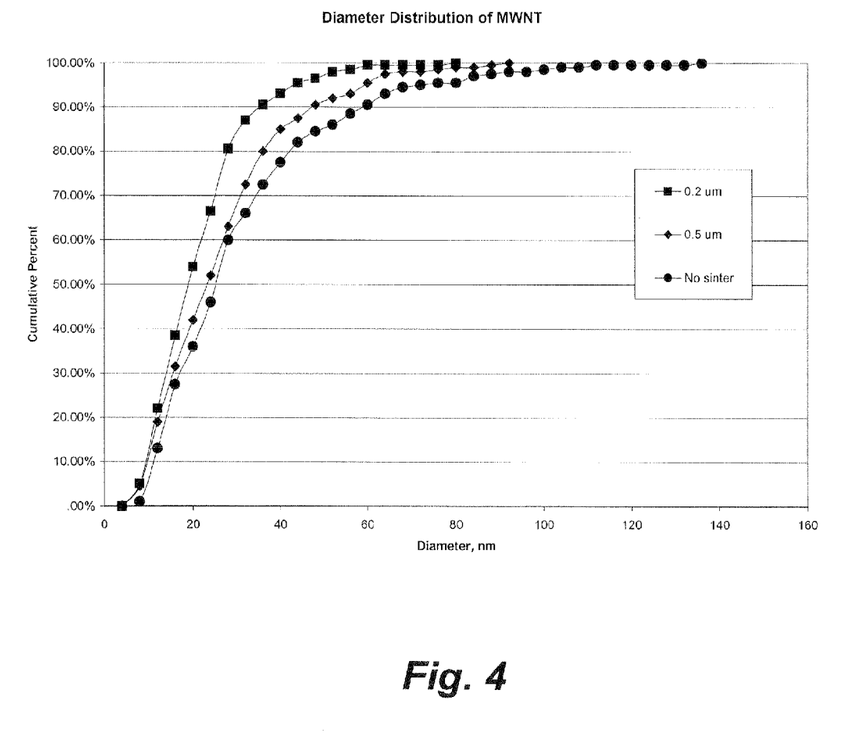
FIG. 4 shows the cumulative percent diameter distribution of aligned carbon nanotubes produced by the methods of the present invention. The metal catalyst/liquid hydrogen feed solution was passed through stainless steel sinters having pore sizes of 0.5 μm and 0.2 μm for comparison to a control feed solution sample which was not passed through a sinter.

As seen in FIG. 4, passing the feed solution through sinters having successively smaller pore sizes reduces both the maximum diameter and the average diameter of carbon nanotubes produced. Similarly, as sinter pore size is reduced, the overall diameter size distribution of the carbon nanotubes produced becomes narrower. Accordingly, the method of this invention provides a relatively simple means for controlling the external diameter and the range of external diameters of carbon nanotubes produced, providing a more uniform, higher quality product.

As described herein and demonstrated in the foregoing examples, the present invention provides numerous advantages over currently employed batch processing methods. The method significantly reduces labor required, and allows synthesis of aligned carbon nanotubes without need for use of specially patterned substrates. In contrast to batch processing techniques, batch to batch variation in quality is reduced. The ability to narrowly restrict the range of external diameters of the carbon nanotube population further improves the quality of the product. Accordingly, the method and apparatus of the present invention provide a viable, low cost route for large scale production of high quality, aligned carbon nanotubes for use in a variety of applications.

The foregoing description of preferred embodiments of the invention has been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method for continuous production of aligned carbon nanotubes comprising the steps of:
   dissolving a metal catalyst in a liquid hydrocarbon source to form a feed solution;
   dispersing the feed solution into a stream of an inert carrier gas;
   introducing the feed solution directly into a reactor at a partial pressure of carbon of from about 48 millibar to about 150 millibar;
   volatilizing the feed solution in the reactor; and
   continuously passing a substrate through the reactor and growing aligned carbon nanotubes on the substrate.

2. The method set forth in claim 1, wherein said metal catalyst is admixed with said liquid hydrocarbon to yield a metal to carbon ratio of from about 0.075 atomic percent to about 1.25 atomic percent.

3. The method set forth in claim 1, wherein said metal catalyst is admixed with said liquid hydrocarbon to yield a metal to carbon ratio of 0.75 atomic percent.

4. The method set forth in claim 1, wherein said metal catalyst is selected from the group consisting of ferrocene, nickelocene, cobaltocene, manganocene, ruthenocene, iron napthenate, nickel napthenate, cobalt napthenate and any mixture thereof.

5. The method set forth in claim 1, wherein said liquid hydrocarbon is any liquid hydrocarbon vaporizing at a temperature of from about 150 C to about 600 C and having a solubility of at least 0.5 weight percent for said metal catalyst.

6. The method set forth in claim 5, wherein said liquid hydrocarbon is selected from the group comprising aromatic hydrocarbons, aliphatic hydrocarbons, nitrogen-containing hydrocarbons, and any combination thereof.

7. The method set forth in claim 5, wherein said liquid hydrocarbon is selected from the group consisting of xylene, toluene, benzene, hexane, pyridine, acetonitrile, and any mixture thereof.

8. The method set forth in claim 1, wherein said inert carrier gas is a Group VIII Noble gas or nitrogen.

9. The method set forth in claim 8, wherein said inert carrier gas is selected from the group consisting of argon, helium, nitrogen, and any mixture thereof.

10. The method set forth in claim 1, wherein said inert carrier gas stream contains hydrogen in a concentration of up to 30 volume percent.

11. The method set forth in claim 1, wherein said inert carrier gas stream contains hydrogen in a concentration of 10 volume percent.

12. The method set forth in claim 1, wherein said reactor is maintained at a temperature of from about 500 C to about 900 C.

13. The method set forth in claim 1, wherein said reactor is maintained at a temperature of from about 650 C to about 850 C.

14. The method set forth in claim 1, wherein said feed solution dispersed in the inert carrier gas is delivered into the reactor at a partial pressure of carbon which substantially prevents formation of amorphous carbon and pyrolytic carbon.

15. The method set forth in claim 1, wherein said substrate is selected from the group consisting of inert glasses and inert metals having a thermal stability at a temperature of from about 500 C to about 900 C and having substantially no carbon solubility at a temperature of up to 900 C.

16. The method set forth in claim 15, wherein said substrate is selected from the group consisting of quartz, silicon, n-doped silicon, p-doped silicon, titanium nitride, and any mixture thereof.

17. The method set forth in claim 1, wherein said substrate has a residence time within said reactor of from about 10 minutes to about 120 minutes.

18. The method set forth in claim 1, further comprising controlling an external diameter of the aligned carbon nanotubes by passing the feed solution dispersed in the inert carrier gas through an inert, porous medium prior to delivery into the reactor.

19. The method set forth in claim 18, further comprising fabricating said inert, porous medium from the group consisting of transition metal elements, transition metal element alloys, zirconia, silicon carbide, silica ceramics, and combinations thereof.

20. The method set forth in claim 18, further comprising fabricating said inert, porous medium from the group of materials consisting of ceramic, alumina, steel, stainless steel, nickel, titanium, nickel-chromium alloys, and any mixture thereof.

21. The method set forth in claim 18, wherein said inert, porous medium contains pores of from about 0.1 μm to about 1 μm in diameter.

22. The method set forth in claim 1, further including maintaining a substantially oxygen-free environment in said reactor.

23. A method for restricting an external diameter of carbon nanotubes produced by chemical vapor deposition, comprising the steps of:
   dissolving a metal catalyst in a liquid hydrocarbon source to form a feed solution;
   dispersing the feed solution in an inert carrier gas in a dispersion chamber having a length and a diameter;
   passing said feed solution dispersed in the inert carrier gas through an inert, porous medium;
   volatilizing the feed solution in a reactor;
   continuously passing a substrate through the reactor to allow growth of aligned carbon nanotubes on the substrate; and
   recovering aligned carbon nanotubes from the substrate.

24. The method set forth in claim 23, wherein said inert, porous medium is fabricated from a material selected from a group consisting of transition metal elements, transition metal element alloys, zirconia, silicon carbide, silica ceramics, and combinations thereof.

25. The method set forth in claim 23, wherein said inert, porous medium is a sinter fabricated from a material selected from a group of materials consisting of ceramic, alumina, steel, stainless steel, titanium, and any mixture thereof.

26. The method set forth in claim 23, wherein said inert, porous medium contains pores of from about 0.1 μm to about 1 μm in diameter.

* * * * *